Figure 1:
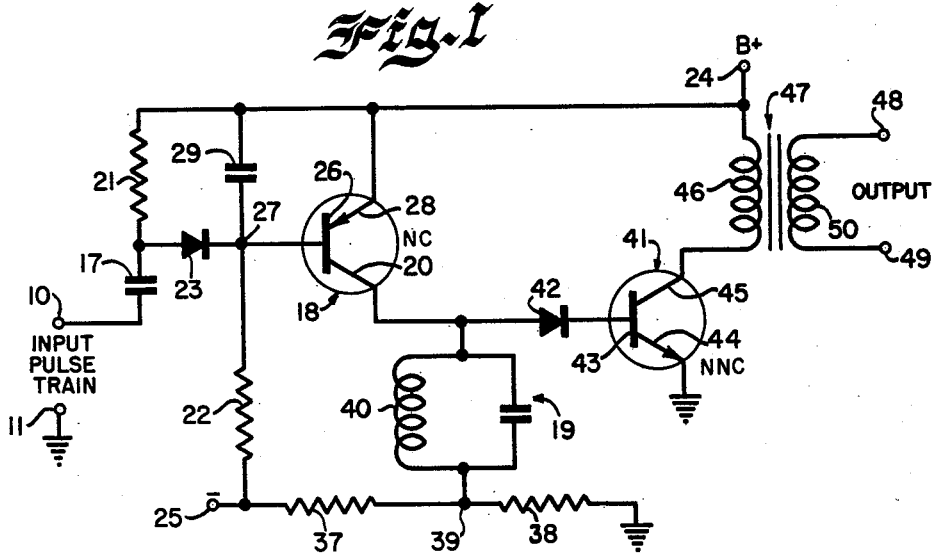

Jan. 29, 1963 E. A. BIANCHI 3,076,103
DISCRIMINATOR RESPONSIVE TO UNIFORMLY SPACED PULSES
UTILIZING NORMALLY DAMPED RESONANT TANK
FEEDING THRESHOLD OUTPUT CIRCUIT
Filed March 1, 1960

INVENTOR.
EDUARDO A. BIANCHI
BY
ATTORNEY

United States Patent Office 3,076,103
Patented Jan. 29, 1963

3,076,103
DISCRIMINATOR RESPONSIVE TO UNIFORMLY SPACED PULSES UTILIZING NORMALLY DAMPED RESONANT TANK FEEDING THRESHOLD OUTPUT CIRCUIT
Eduardo Alberto Bianchi, Rochester, N.Y., assignor to General Dynamics Corporation, Rochester, N.Y., a corporation of Delaware
Filed Mar. 1, 1960, Ser. No. 12,148
10 Claims. (Cl. 307—88.5)

The present invention relates generally to a pulse decoder circuit and is more particularly concerned with a new and improved circuit for discriminating pulses occurring at regular repetition rates from those occurring at random with non-uniform spacings therebetween.

In a number of different applications, particularly in communications equipment receiving an incoming train of pulses, it is desirable to be able to distinguish those pulses in the train which are spaced uniformly apart from other non-uniformly spaced pulses. For example, in aircraft position finding equipment generally known as Tacan, the normal output from each beacon station is normally interrupted during spaced apart intervals so that the station can transmit pulses keyed in continental Morse code in order to identify the particular station involved. The normal beacon output comprises pulses which are generated either in response to interrogations from the several aircraft in the area or by noise but, in any event, the pulses occur at random and are non-uniformly distributed. During the beacon identification interval, however, pairs of pulses are transmitted with the spacing between the pulse pairs being uniform during each keying period of the Morse code although the keying periods themselves obviously alternate between short and long intervals characterizing the Morse code. The airborne receiving equipment must be able to distinguish between the identity pulses and the random pulses normally transmitted. While circuits have been employed prior to the present invention for solving this problem, such circuits have been very complex. The primary object of the present invention is to provide a pulse decoding circuit of the character described which is very simple since it is formed of a minimum number of relatively inexpensive component elements.

A further object of the invention resides in the provision of a pulse decoding circuit of the type referred to above which is capable of readily distinguishing between the uniform and non-uniform pulses without requiring the use of a large number of complex circuit components.

The invention has for another object the provision of a circuit of the type indicated characterized by a relatively fast response both to the arrival of the uniform pulses and to the termination of such pulses and also characterized by a relatively high signal to noise ratio.

The foregoing and other objects are realized, in accordance with the present invention, by the provision of a circuit excited by an input train of pulses of the type previously described including a first pulse group having non-uniform spacings between the pulses and a second uniformly spaced group of pulses. The circuit includes a pair of directly coupled transistors the first of which is excited by the incoming pulse train and includes in its output a ringing tank circuit. The incoming train of positive going pulses is applied to the first transistor through an input circuit which biases this transistor to conduction in the absence of pulses. A series of closely spaced pulses will drive the first transistor to cutoff to permit the tank circuit to ring freely. When a long gap exists between the random pulses, the first transistor conducts thus damping and preventing buildup of oscillations in the tank circuit. During the identification interval when the coded pulse pairs arrive with a very short spacing between the individual pulses of each pair and with a long but uniform spacing between the different pairs, the first transistor reaches conduction during each of the long spacing periods, thus pulsing or shock exciting the tank circuit during each of the latter periods. The oscillations in the tank circuit thus build up rapidly to a level sufficient to drive the second transistor to conduction to provide an output ringing signal from the circuit.

Figure 2:
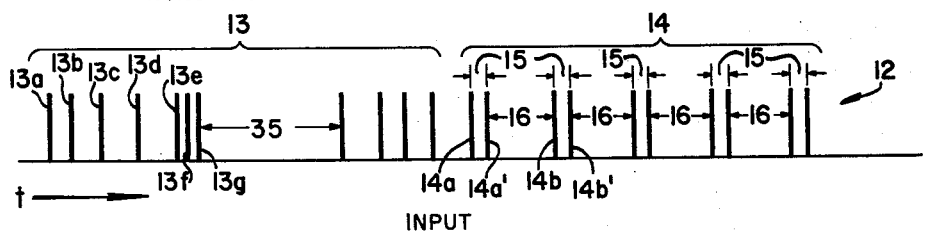
Figure 2:
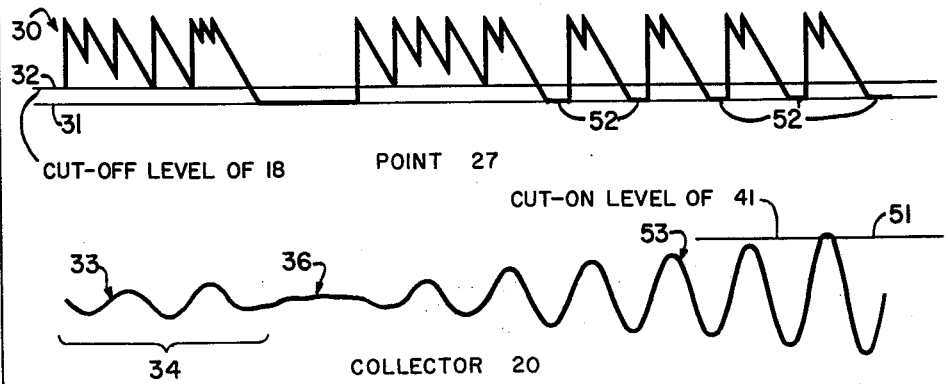

The invention, both as to its organization and manner of operation together with further objects and advantages, will best be understood by reference to the following description considered in conjunction with the accompanying drawing wherein:

FIG. 1 is a schematic diagram illustrating a pulse decoding circuit characterized by the features of the present invention; and FIG. 2 depicts a number of typical waveforms which might appear at different points in the circuit shown in FIG. 1.

Referring now to the drawing, it will be observed that the circuit illustrated in FIG. 1 has applied across its input terminals 10 and 11 a pulse train of the type represented by the waveform 12 shown in FIG. 2. As was previously mentioned, this input pulse train may comprise a group of non-uniformly spaced, random pulses occurring through the period indicated at 13 in FIG. 2 followed by a group of pulse pairs uniformly distributed through the interval indicated at 14. The individual random pulses have been identified by reference numerals 13a, 13b, 13c, etc. while the first pair of the code pulses are respectively identified as 14a and 14a', the second pair bears reference numerals 14b and 14b' and so on. The very short periods between the pulses of each coded pair are indicated at 15 while the long but uniform spacings between the different pulse pairs are indicated at 16. The pulses in the train are all positive and are of substantially the same amplitude, conditions which can be achieved by the use of a limiter and, if necessary, a phase inverter circuit.

The pulse train signal 12 is applied through a coupling capacitor 17 to the input circuit of a transistor 18 of the PNP junction type which serves to control the oscillations of a tank circuit 19 connected to its collector 20. More specifically, the input circuit of the transistor includes a voltage divider network consisting of resistors 21 and 22 and diode 23 connected in series between a B+ terminal 24 supplying a positive D.C. voltage and a negative terminal 25. The values of resistors 22 and 21 are such that in the absence of incoming pulses the D.C. voltage between the base 26 and the emitter 28 of the transistor is at a level to cause conduction of the transistor. To this end, the junction 27 between the resistor 22 and the cathode of the diode 23 is connected directly to the base 26 while the emitter 28 is connected to the B+ terminal 24. A capacitor 29 is connected between the base and emitter. D.C. operating potential for the collector 20 is supplied by a voltage dividing network consisting of resistors 37 and 38 connected between the negative terminal 25 and ground with the junction 39 between the resistors being connected to the collector through the inductor 40 in the tank circuit.

The positive pulses in the input train 12 are applied through the diode 23 to the base 26 while any negative going signal portions are, of course, eliminated. The positive pulses are of sufficient amplitude to drive the junction 27 to a point where it is more positive than the B+ voltage thus cutting off the transistor 18 and permitting the tank circuit 19 to ring freely or to begin the buildup of oscillations. The voltage existing at the junction 27 in the presence of the input train 12 is represented in FIG. 2 by the waveform 30. The lower level 31 of the latter voltage is that required to maintain conduction through the transistor 18 while the level 32 represents the level required to cut off the latter transistor. Thus, it will be observed that the incoming random pulse 13a drives the transistor to cutoff and charges the capacitor 29. This capacitor then begins to discharge through resistor 22 but before it can complete its discharge to the level required to re-initiate conduction through the transistor 18, the pulse 13b arrives to recharge the capacitor. Thus, a series of narrow spaced random pulses is effective to maintain the transistor 18 cut off to permit the tank circuit 19 to begin the gradual buildup of oscillations. The voltage across the latter tank circuit is depicted by the waveform 33 in FIG. 2 from which it can be seen that the arrival of the closely spaced pulses 13a, 13b, 13c, 13d, 13e and 13f causes the junction 27 to remain at a sufficiently high positive voltage to maintain cutoff in the transistor 18 so that oscillations in the tank circuit begin to build up during the interval designated by reference numeral 34. However, when a long gap exists in the random pulse period such as that indicated at 35 on the wave 12 the junction 27 reaches a potential where the transistor again conducts to damp the oscillations in the tank circuit as indicated by the wave portion 36. Since these long gap periods occur frequently during the random pulse period 13 the oscillations in the tank circuit cannot build up to any great extent.

The signal appearing across the tank circuit drives an output transistor 41 of the NPN junction type which is directly coupled to the input transistor 18. To this end, the collector 20 is connected through a diode 42 to the base 43 of the output transistor. The emitter 44 of the latter transistor is grounded while the collector 45 is connected through the primary winding 46 of an output transformer 47 to the B+ terminal 24 and, of course, to the emitter 28. The direct coupling of the transistors avoids the use of an RC coupling network which would load the tuned circuit 19. The output from the pulse decoding circuit is derived across a pair of output terminals 48 and 49 respectively connected to the opposed ends of the secondary winding 50 of the output transformer.

The transistor 41 is normally biased to cutoff and cannot conduct until the signal appearing across the tank circuit 19 reaches a substantial value as indicated by the level 51 on the waveform 33 shown in FIG. 2. Since, as was mentioned above, the tank circuit voltage does not reach a level sufficient to drive the transistor 41 to conduction during the random pulse period 13 of the input signal, no signal appears across the output terminals 48 and 49 until the arrival of uniformly spaced pulses during the period 14. The pulses arriving during the latter period are separated by alternate short spacings 15 and long spacings 16. The RC time constant of the capacitor 29 and resistor 22 is selected to permit the voltage at the junction 27 to reach the conduction level for the transistor 18 during each of the long spacings 16 as is indicated by the voltage points 52 on the waveform 30. The short spacings 15 are so small that the capacitor 29 cannot discharge sufficiently to permit conduction by the transistor 18. However, the conduction of the transistor during the period 14 occurs at a periodic rate coinciding with the natural resonant frequency of the tank circuit 19 and as a result the oscillations in the tank circuit build up very rapidly as is indicated by the portion 53 of the waveform 33 shown in FIG. 2. As soon as the peak voltage of the signal appearing across the tank circuit reaches the level indicated at 51 the output transistor 41 conducts at a regularly recurring rate. The signal applied to the input of the transistor 41 is amplified to provide an output signal. This output signal persists through the first keying period of the Morse code and is terminated at the end of that period. The output, of course, appears again near the beginning of the succeeding keying period and so on. Thus, the output can be used to identify the coded signals arriving during the period 14 and, in the case of the Tacan equipment referred to above, the output will identify the particular beacon station being interrogated.

The diode 42 prevents the application of negative going signals across the base and emitter of the transistor 41 but in the event that the emitter to base zener breakdown of the latter transistor is high enough to withstand the maximum negative signals developed across the tank circuit this diode may be eliminated. It has been found that the circuit described provides excellent signal to noise ratio. This ratio may be improved by increasing the resistance of the resistor 22 but since the output power decreases to some extent with an increase in the latter resistor some compromise value must be selected to provide both good signal to noise ratio and adequate output. The particular value selected will, of course, vary with the pulse code to be detected and particularly with the spacing 16 between the uniformly distribted pulses. While the uniformly distributed pulses are illustrated as comprising pulse pairs this has been done solely because such pairs are present in the pulse train employed in the Tacan equipment. It will be recognized that the circuit described will distinguish equally as well between the random pulses and uniformly distributed single pulses.

In view of the foregoing description it will be recognized that the circuit illustrated is effective to accomplish all of the enumerated objects of the invention. While a particular embodiment of the invention has been shown and described, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A pulse decoding circuit for distinguishing between uniformly distributed pulses and non-uniformly spaced random pulses of an input wave train, said circuit comprising a first transistor of the PNP type having a base electrode, an emitter electrode and a collector electrode, means for supplying D.C. operating potentials for the electrodes of said first transistor and including a voltage dividing network connected across D.C. power supply means, said network including in order between positive and negative terminals of said power supply means a first resistor, a first rectifier having a cathode and an anode and poled for D.C. current conduction therethrough from the power supply means, and a second resistor with the junction between the first rectifier cathode and the second resistor being connected to the first transistor base electrode, means connecting the emitter electrode to said network at a point more positive than said junction, whereby said first transistor is normally biased to conduction, a capacitor connected between said junction and a point in said network normally more positive than said junction, the input pulse train being supplied to the anode of said first rectifier in order to pass positive pulses through the rectifier to the junction, thereby to drive said first transistor to cutoff and to charge said capacitor to a value above the cutoff potential for the first transistor, means including said second resistor providing a discharge path for said capacitor through which the charge on said capacitor is dissipated in the absence of an input pulse whereby during the gaps between pulses the junction is driven towards a voltage level causing conduction through the first transistor, a tank circuit connected to the collector of said first transistor, a second transistor of the NPN type having a base, an emitter and a collector, means including a second rectifier connecting the collector electrode of the first transistor to the base of the second transistor, said second rectifier being poled to pass only positive signals from the tank circuit to the base of the second transistor, means including the primary winding of an output transformer connecting the collector of the second transistor to the positive terminal of the power supply means, and means biasing the second transistor so that it is normally cut off, the RC time constant of the second resistor and the capacitor being such that voltage at said junction reaches said voltage level during each of the uniform spacings between the uniformly distributed pulses, thereby to cause conduction of said first transistor at a regularly recurring rate in the presence of the latter pulses, the regularly recurring conduction of said first transistor being effective to excite said tank circuit at a frequency substantially equal to its natural resonant frequency to cause a buildup in oscillations in said tank circuit until said oscillations become sufficient to cause conduction of said second transistor, thereby to develop an output across the secondary of said transformer, the random pulses causing conduction of said first transistor at a random, non-recurring rate with the oscillations in the tank circuit being damped by conduction of the first transistor during any gaps between the random pulses longer than the spacing between the uniformly distributed pulses.

2. A pulse decoding circuit for distinguishing between uniformly distributed pulses and non-uniformly spaced random pulses of an input wave train, said circuit comprising a first transistor having a base electrode, an emitter electrode and a collector electrode, means for supplying D.C. operation potentials for the electrodes of said first transistor and including a voltage dividing network connected across D.C. power supply means, said network including in order between positive and negative terminals of said power supply means a first resistor, a first rectifier having a cathode and an anode and poled for D.C. current conduction therethrough from the power supply means, and a second resistor with the junction between the first rectifier cathode and the second resistor being connected to the first transistor base electrode, means connecting the emitter electrode to said network at a point more positive than said junction, whereby said first transistor is normally biased to conduction, a capacitor connected between said junction and a point in said network normally more positive than said junction, the input pulse train being supplied to the anode of said first rectifier in order to pass positive pulses through the rectifier to the junction, thereby to drive said first transistor to cutoff and to charge said capacitor to a value above the cutoff potential for said first transistor, means including said second resistor providing a discharge path for said capacitor through which the charge on said capacitor is dissipated in the absence of an input pulse, whereby during the gaps between pulses the junction is driven towards a voltage level causing conduction through the first transistor, a tank circuit connected to the collector of said first transistor, a second transistor having a base, an emitter and a collector, means connecting the collector electrode of the first transistor to the base of the second transistor, means including the primary winding of an output transformer connecting the collector of the second transistor to the positive terminal of the power supply means, and means biasing the second transistor so that it is normally cut off, the RC time constant of the second resistor and the capacitor being such that voltage at said junction reaches said voltage level during each of the uniform spacings between the uniformly distributed pulses, thereby to cause conduction of said first transistor at a regularly recurring rate in the presence of the latter pulses, the regularly recurring conduction of said first transistor being effective to excite said tank circuit at a frequency substantially equal to its natural resonant frequency to cause a buildup in oscillations in said tank circuit until said oscillations become sufficient to cause conduction of said second transistor, thereby to develop an output across the secondary of said transformer, the random pulses causing conduction of said first transistor at a random, non-recurring rate with the oscillations in the tank circuit being damped by conduction of the first transistor during any gaps between the random pulses longer than the spacing between the uniformly distributed pulses.

3. A pulse decoding circuit for distinguishing between uniformly spaced pulses and non-uniformly spaced random pulses of an input wave train, said circuit comprising a first transistor having a base electrode, an emitter electrode and a collector electrode, means for supplying D.C. operating potentials for the electrodes of said first transistor and including a voltage dividing network connected across D.C. power supply means, said network including in order between positive and negative terminals of said power supply means a first resistor, a first rectifier having a cathode and an anode and poled for D.C. current conduction therethrough from the power supply means, and a second resistor with the junction between the first rectifier cathode and the second resistor being connected to the first transistor base electrode, means connecting the emitter electrode to said network at a point more positive than said junction, whereby said first transistor is normally biased to conduction, a capacitor connected between said junction and a point in said network normally more positive than said junction, the input pulse train being supplied to the anode of said first rectifier in order to pass positive pulses through the rectifier to the junction, thereby to drive said first transistor to cutoff and to charge said capacitor to a value above the cutoff potential for the first transistor, a discharge circuit including said second resistor providing a path for discharging said capacitor in the absence of an input pulse, whereby during the gaps between pulses the junction is driven towards a voltage level causing conduction through the first transistor, a tank circuit connected to the collector of said first transistor, a second transistor having a base, an emitter and a collector, means connecting the collector electrode of the first transistor to the base of the second transistor, means including an output load device for said second transistor connecting the collector of the second transistor to the positive terminal of the power supply means, and means biasing the second transistor so that it is normally cut off, the RC time constant of the capacitor and its associated discharge circuit being such that voltage at said junction reaches said voltage level during each of the uniform spacings between the uniformly distributed pulses, thereby to cause conduction of said first transistor at a regularly recurring rate in the presence of the latter pulses, the regularly recurring conduction of said first transistor being effective to excite said tank circuit at a frequency substantially equal to its natural resonant frequency to cause a buildup in oscillations in said tank circuit until said oscillations become sufficient to cause conduction of said second transistor, thereby to develop an output across the output load device, the random pulses causing conduction of said first transistor at a random, non-recurring rate with the oscillations in the tank circuit being damped by conduction of the first transistor during any gaps between the random pulses longer than the spacing between the uniformly distributed pulses.

4. A pulse decoding circuit for distinguishing between uniformly distributed pulses and non-uniformly spaced random pulses of an input wave train, said circuit comprising a first transistor having a base electrode, an emitter electrode and a collector electrode, means for supplying D.C. operating potentials for the electrodes of said first transistor of such value that said first transistor is normally biased to conduction, an input circuit for supplying the input pulse train to drive the latter to cutoff when each pulse is applied, said input circuit including a capacitor charged by each input pulse and connected to supply to one of the electrodes of said first transistor a potential for maintaining said first transistor cut off for a predetermined period following each pulse, a discharge circuit for discharging said capacitor in the absence of an input pulse, whereby during the gaps between pulses said one electrode is driven towards a voltage level causing conduction through the first transistor, a tank circuit connected to another electrode of said first transistor, a second transistor having a base, an emitter and a collector, means connecting said another electrode of the first transistor to the base of the second transistor, and means for supplying operating potentials for the second transistor of such value that it is normally biased to cutoff, the time constant of the capacitor and its discharge circuit being such that voltage on said one electrode reaches said voltage level during each of the uniform spacings between the uniformly distributed pulses, thereby to cause conduction of said first transistor at a regularly recurring rate in the presence of the latter pulses, the regularly recurring conduction of said first transistor being effective to excite said tank circuit at a frequency substantially equal to its natural resonant frequency to cause a buildup in oscillations in said tank circuit until said oscillations become sufficient to cause conduction of said second transistor, the random pulses causing conduction of said first transistor at a random, non-recurring rate with the oscillations in the tank circuit being clamped by conduction of the first transistor during any gaps between the random pulses longer than the spacing between the uniformly distributed pulses.

5. A pulse decoding circuit for distinguishing between uniformly distributed pulses and non-uniformly spaced random pulses of an input wave train, said circuit comprising a first transistor having a base electrode, an emitter electrode and a collector electrode, means for supplying D.C. operating potentials for the electrodes of said first transistor of such value that said first transistor is normally biased to conduction, an input circuit for supplying the input pulse train to said first transistor to drive the latter to cutoff when each pulse is applied, said input circuit including a capacitor charged by each input pulse and connected to supply to one of the electrodes of said first transistor a potential for maintaining said first transistor cut off in a predetermined period following each pulse, a discharge circuit for discharging said capacitor in the absence of an input pulse, whereby during the gaps between pulses said one electrode is driven towards a voltage level causing conduction through the first transistor, a tank circuit connected to another electrode of said first transistor, the time constant of the capacitor and its discharge circuit being such that voltage on said one electrode reaches said voltage level during each of the uniform spacings between the uniformly distributed pulses, thereby to cause conduction of said first transistor at a regularly recurring rate in the presence of the latter pulses, the regularly recurring conduction of said transistor being effective to excite said tank circuit to cause a buildup in oscillations therein, and an output circuit including a second transistor normally biased to cutoff and driven by the oscillations developed in said tank circuit, said second transistor being driven to conduction only when said oscillations build up to a predetermined value, the random pulses causing conduction of said first transistor at a random, non-recurring rate with the oscillations in the tank circuit being damped by conduction of the first transistor during any gaps between the random pulses longer than the spacing between the uniformly distributed pulses.

6. In a pulse decoding circuit for distinguishing between uniformly distributed pulses and non-uniformly spaced random pulses of an input wave train, said circuit comprising a transistor having a plurality of electrodes, means for supplying D.C. operating potentials for the electrodes of said transistor of such value that said transistor is normally biased to conduction, an input circuit for supplying the input pulse train to said transistor to drive the latter to cutoff when each pulse is applied, said input circuit including a capacitor charged by each input pulse and connected to supply to one of the electrodes of said transistor a potential for maintaining said transistor cut off for a predetermined period following each pulse, a discharge circuit for discharging said capacitor in the absence of an input pulse, whereby during the gaps between pulses said one electrode is driven towards a voltage level causing conduction through the transistor, and a tank circuit connected to another electrode of said transistor, the time constant of the capacitor and its discharge circuit being such that voltage on said one electrode reaches said voltage level during each of the uniform spacings between the uniformly distributed pulses, thereby to cause conduction of said transistor at a regularly recurring rate in the presence of the latter pulses, the regularly recurring conduction of said transistor being effective to excite said tank circuit to cause a buildup in oscillations therein, the random pulses causing conduction of said transistor at a random, non-recurring rate with the oscillations in the tank circuit being damped by conduction of the transistor during any gaps between the random pulses longer than the spacing between the uniformly distributed pulses.

7. A pulse decoding circuit for distinguishing between uniformly distributed pulses and non-uniformly distributed random pulses in an input pulse train, said circuit comprising a first controlled discharge device including a control electrode, means normally biasing said control electrode to sustain conduction through the first device, an output circuit from said first device including a resonant tank damped by the conduction of said first device, an input circuit to said first device excited by the input train and including a capacitor charged by the pulses in said train, said pulses being effective to overcome the biasing means in order to cut off said first device and, hence, to permit the tank to begin oscillation, a discharge circuit providing a path for discharging said capacitor in the absence of pulses, means connecting the control electrode of said first device to a point in said discharge circuit in order to apply to said electrode a potential to cut off said first device following each pulse for a predetermined period required for said point to reach a voltage level sufficient to again cause conduction through said first device, said predetermined period being a function of the time constant of the capacitor and its discharge circuit and said time constant being such that the uniform spacing between the uniformly distributed pulses is sufficient to permit said point to reach said voltage level during each such spacing, thereby causing conduction of said first device at a regularly recurring rate substantially equal to the natural resonant frequency of the tank during the arrival of the uniformly distributed pulses so that oscillations build up in said tank, the random pulses causing conduction of said first device at a non-recurring rate and being effective during gaps therebetween longer than said uniform spacing to cause conduction of said device for a sustained period in order to damp the oscillations of said tank, and output means driven by the oscillations of said tank and including a second controlled discharge device normally biased to cutoff and driven to conduction only when said oscillations reach a predetermined value.

8. In a pulse decoding circuit for distinguishing between uniformly distributed pulses and non-uniformly distributed random pulses in an input pulse train, the combination of a controlled discharge device including a plurality of electrodes, means normally biasing at least one of said electrodes to sustain conduction through the device, an output circuit from said device including a resonant tank damped by the conduction of said device, an input circuit to said device excited by the input train and including a capacitor charged by the pulses in said train, said pulses being effective to overcome the biasing means in order to cut off said device and, hence, to permit the tank to begin oscillation, a discharge circuit providing a path for discharging said capacitor in the absence of pulses, and means connecting one of the electrodes of said device to a point in said discharge circuit in order to apply to the latter electrode a potential to cut off said device following each pulse for a predetermined period required for said point to reach a voltage level sufficient to again cause conduction through said device, said predetermined period being a function of the time constant of the capacitor and its discharge circuit and said time constant being such that the uniform spacing between the uniformly distributed pulses is sufficient to permit said point to reach said voltage level during each such spacing, thereby causing conduction of said device at a regularly recurring rate substantially equal to the natural resonant frequency of the tank luring the arrival of the uniformly distributed pulses so that oscillations build up in said tank, the random pulses causing conduction of said device at a non-recurring rate and being effective during gaps therebetween longer than said uniform spacings to cause conduction of said device for a sustained period in order to damp the oscillations in said tank.

9. A pulse decoding circuit for distinguishing between uniformly distributed pulses and non-uniformly distributed random pulses in an input pulse train, said circuit comprising a first controlled discharge device, means normally biasing said first discharge device to sustain conduction therethrough, an output circuit from said first device including a resonant tank damped by the conduction of said first device, an input circuit to said first device excited by the input train to supply pulses overcoming the biasing means in order to cut off said first device and, hence, to permit the tank to begin oscillation, said input circuit including means for maintaining said first device cutoff following each pulse for a predetermined period and, in the absence of pulses during said predetermined period, for again permitting the biasing means to cause conduction of said first device at the expiration of said period, said predetermined period being shorter than the uniform spacing between the uniformly distributed pulses so that the first device conducts during each such spacing, whereby the uniformly distributed pulses cause conduction of said first device at a regularly recurring rate to build up oscillations in said tank, the random pulses causing conduction of said first device at a non-recurring rate and being effective during gaps therebetween longer than said uniform spacing to cause conduction of said device for a sustained period in order to damp the oscillations of said tank, and a circuit driven by the oscillations of said tank and including a second controlled discharge device normally biased to cutoff and driven to conduction only when said oscillations reach a predetermined value.

10. In a pulse decoding circuit for distinguishing between uniformly distributed pulses and non-uniformly distributed random pulses in an input pulse train, the combination of a controlled discharge device, means normally biasing said device to sustain conduction therethrough, an output circuit from said device including a resonant tank damped by the conduction of said device, an input circuit to said device excited by the input train to supply pulses overcoming the biasing means in order to cut off said device and, hence, to permit the tank to begin oscillation, said input circuit including means for maintaining said device cutoff following each pulse for a predetermined period and, in the absence of pulses during said period, for again permitting the biasing means to cause conduction of said device at the expiration of said period, said predetermined period being shorter than the uniform spacing between the uniformly distributed pulses so that the device conducts during each such spacing, whereby the uniformly distributed pulses cause conduction of said device at a regularly recurring rate to build up oscillations in said tank, the random pulses causing conduction of said device at a non-recurring rate and being effective during gaps therebetween longer than said uniform spacing to cause conduction of said device for a sustained period in order to damp the oscillations in said tank.

References Cited in the file of this patent
UNITED STATES PATENTS

| | | |
|---|---|---|
| 2,549,776 | Cleeton | Apr. 24, 1951 |
| 2,801,338 | Keller | July 30, 1957 |